No. 841,519. PATENTED JAN. 15, 1907.
R. B. HEPNER.
WATER CLOSET SEAT.
APPLICATION FILED AUG. 17, 1905.

Witnesses
Edward C. Rowland,
M. F. Keating

Inventor
Rufus B. Hepner
By his Attorney
Charles J. Kintner

UNITED STATES PATENT OFFICE.

RUFUS B. HEPNER, OF NEW YORK, N. Y.

WATER-CLOSET SEAT.

No. 841,519.

Specification of Letters Patent.

Patented Jan. 15, 1907.

Application filed August 17, 1905. Serial No. 274,549.

*To all whom it may concern:*

Be it known that I, RUFUS B. HEPNER, a citizen of the United States, residing in New York, borough of Manhattan, county and State of New York, have made a new and useful Invention in Water-Closet Seats, of which the following is a specification.

My invention is directed particularly to improvements in supplemental closet-seats adapted for use with well-known forms of closet-seats; and it has for its objects, first, the provision of a sectional supplemental closet-seat adapted to be folded up for transportation and having a seat-hole of relatively much smaller diameter than the corresponding seat-hole of ordinary closet-seats, its function being to adapt such supplemental seat for the use of a child with the ordinary seat; second, the provision of means whereby the sections of such supplemental seat may be rigidly locked in a plane whereby any danger of the user thereof being pinched thereby is avoided.

For a full and clear understanding of my invention reference is had to the accompanying drawings, in which—

Figure 1:
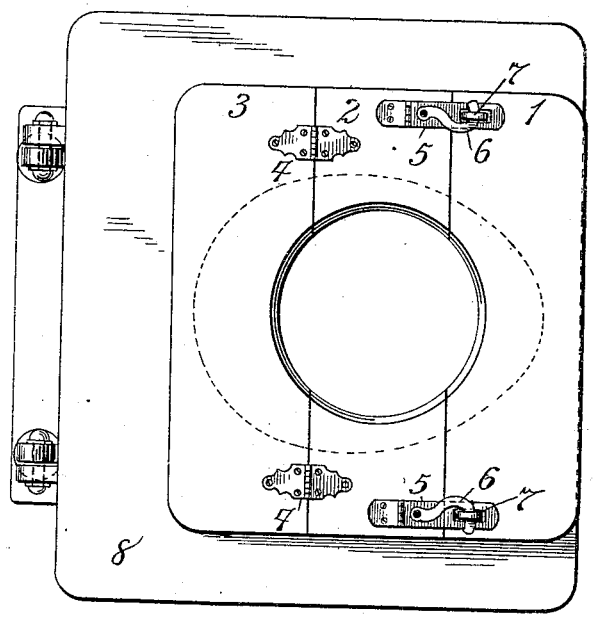
Figure 2:
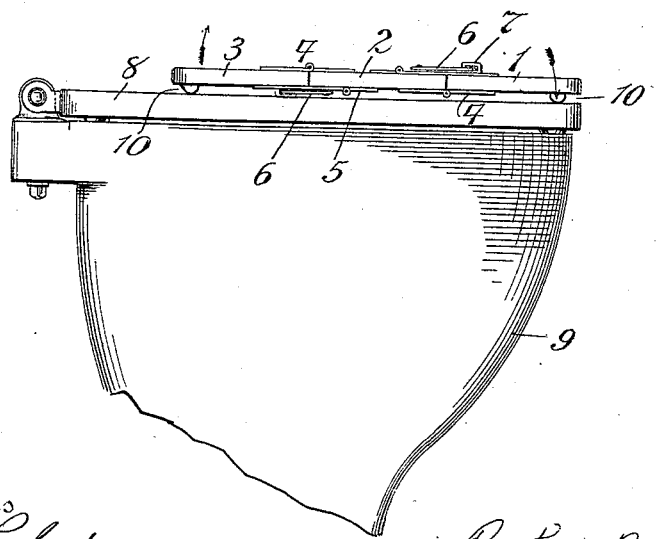

Figure 1 is a plan view illustrating my improvements as applied to an ordinary closet-seat. Fig. 2 is a side elevational view illustrating the closet-bowl, the ordinary hinged seat applied thereto, and my improvement as sustained thereby.

Heretofore supplemental seats have been devised for use with ordinary closet-seats for the purpose of enabling one to provide for his own use in hotel or public closets a cleanly seat which after use may be folded in a compact form for transportation. A number of such seats have been devised, notably one in which the seat itself is folded up once and another in which it is folded into quadrants or quarter-sections. All such seats, however, so far as I am aware, as before indicated, have been devised for the use of grown persons and for their convenience as to cleanliness or sanitary purposes.

My invention, while possessing features like those found in the type of seat referred to, has an especial utility in its adaptation to the use of a closet-seat for a child in connection with ordinary well-known closet-seats found in bath-rooms and in the toilet-rooms of public places.

Heretofore, so far as I am aware, no one has devised any such means for the convenience of children, and with this end in view I have devised a novel folding seat having a seat-aperture relatively considerably smaller than the seat-aperture of existing closets, so as to adapt it, as before stated, for the use of a child.

I have also ascertained in the use of such a seat that if some means be not provided for maintaining the sections of the seat when unfolded and ready for use in a constant plane there is danger of pinching, and with a view of overcoming this defect I have provided locking means for permanently locking the sections of the seat in a rigid plane, so that while it is of a folding nature it is, in effect, when adjusted ready for use the same as though it were made of a single piece of material.

Referring now to the drawings in detail, my novel folding seat is composed, preferably, of three parallel sections, (indicated by the numerals 1, 2, and 3.) To the middle section 2 the two side sections 1 and 3 are secured by hinges 4 4 on opposite sides, and to the opposite sides of the middle section are secured two hinged locking parts 5 5, provided at their outer ends with eyes adapted to fit accurately over metal loops 7 7, secured in the opposite faces of the sections 1 and 3. Each of these hinged parts is provided with a locking-hook 6 and all so arranged that when the seat is unfolded and assumes the position shown in Fig. 1—namely, that of a plane—the parts may be all rigidly locked together by entering the free ends of the pivoted hooks 6 6 in the loops or eyes 7 7. The seat-hole of diminished size for a child is cut out either before or after the parts are secured together, and the device is then ready for use, and it may be placed over the seat-hole of the seat 8, resting upon the bowl 9 in the manner shown in both figures of the drawings.

10 10 are soft-rubber bearings secured at the four corners of the supplemental seat for preventing scratching of the main seat.

After use the hooks 6 6 are released and all of the parts folded up in compact form, the part 1 turned in the direction of the arrow, Fig. 2, and the part 3 in the direction of the curved arrow shown in the left of Fig. 2.

I do not limit my invention to the especial details of construction shown, as some of the features thereof may be departed from and still come within the scope of my claims hereinafter made.

Having thus described my invention, what

I claim, and desire to secure by Letters Patent of the United States, is—

1. A supplemental closet-seat embracing a number of parallel sections hinged together and provided with means on opposite sides from the hinges thereof for locking such sections in a common plane, substantially as described.

2. A supplemental closet-seat embracing three parallel sections two of which are hinged on opposite sides to the third; in combination with means for locking all of the sections rigidly in a common plane, substantially as described.

3. A supplemental closet-seat embracing three parallel sections hinged together and provided on opposite sides with locking means for locking them rigidly in a common-plane, substantially as described.

4. A supplemental closet-seat having two sections hinged to an intermediate section and on opposite sides, and locking hooks and eyes located on opposite sides from the hinges for locking all of said sections in a common plane, substantially as described.

5. A supplemental closet-seat embracing three folding sections hinged together by two pairs of broad flat hinges located on opposite sides of the seat; in combination with two pairs of broad flat hinged locking parts secured on opposite sides of the middle section and each provided with a pivoted hook and an eye; together with two pairs of loops secured to the outside sections and adapted to pass respectively through the eyes of the locking parts in such manner that all of the sections of the seat may be secured in a rigid plane, substantially as described.

In testimony whereof I have signed my name to this specification in the presence of two subscribing witnesses.

RUFUS B. HEPNER.

Witnesses:
C. J. KINTNER,
M. F. KEATING.